United States Patent
Dombrowski et al.

(10) Patent No.: US 9,365,739 B2
(45) Date of Patent: Jun. 14, 2016

(54) WATERBORNE TWO COMPONENT POLYURETHANE COATING COMPOSITIONS COMPRISING ALICYCLIC RIGID POLYOLS

(71) Applicant: Rohm and Haas Company, Philadelphia, PA (US)

(72) Inventors: Gary W. Dombrowski, Chester Springs, PA (US); Zhenwen Fu, North Wales, PA (US); Caroline Slone, Maple Glen, PA (US); Andrew Swartz, Fleetwood, PA (US); Jia Tang, Phoenixville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 213 days.

(21) Appl. No.: 14/106,953

(22) Filed: Dec. 16, 2013

(65) Prior Publication Data
US 2014/0170327 A1 Jun. 19, 2014

Related U.S. Application Data

(60) Provisional application No. 61/739,083, filed on Dec. 19, 2012.

(51) Int. Cl.
| | |
|---|---|
| *C08G 18/32* | (2006.01) |
| *C08G 18/62* | (2006.01) |
| *C08G 18/65* | (2006.01) |
| *C08G 18/79* | (2006.01) |
| *C09D 133/14* | (2006.01) |
| *C09D 175/04* | (2006.01) |

(52) U.S. Cl.
CPC .......... *C09D 133/14* (2013.01); *C08G 18/3212* (2013.01); *C08G 18/3218* (2013.01); *C08G 18/6254* (2013.01); *C08G 18/6511* (2013.01); *C08G 18/792* (2013.01); *C09D 175/04* (2013.01)

(58) Field of Classification Search
CPC .............. C09D 133/14; C09D 175/04; C08G 18/6254; C08G 18/6511; C08G 18/792; C08G 18/3212; C08G 18/3218
See application file for complete search history.

(56) References Cited

U.S. PATENT DOCUMENTS

| | | | |
|---|---|---|---|
| 5,286,782 A | 2/1994 | Lamb et al. | |
| 5,354,797 A | 10/1994 | Anderson et al. | |
| 5,552,477 A * | 9/1996 | Dhein ................ | C08G 18/0819 524/591 |
| 6,066,692 A | 5/2000 | Tien et al. | |
| 6,428,898 B1 | 8/2002 | Barsotti et al. | |
| 6,726,961 B2 | 4/2004 | Yoshioka et al. | |
| 7,022,759 B2 | 4/2006 | Martin et al. | |
| 7,220,338 B2 | 5/2007 | Chen et al. | |
| 7,414,091 B2 | 8/2008 | Chen et al. | |
| 2004/0151838 A1 | 8/2004 | Fenn et al. | |
| 2006/0155095 A1 | 7/2006 | Daussin et al. | |
| 2008/0139775 A1 | 6/2008 | Wu et al. | |

FOREIGN PATENT DOCUMENTS

| | | |
|---|---|---|
| EP | 2524943 A2 | 11/2012 |
| WO | 9726303 A1 | 7/1997 |

OTHER PUBLICATIONS

Odian, George, Principles of Polymerization, third edition, 1991, pp. 29-33.*

* cited by examiner

*Primary Examiner* — Patrick Niland
(74) *Attorney, Agent, or Firm* — Andrew Merriam

(57) ABSTRACT

The present invention provides two-component polyurethane compositions that are substantially free of VOCs and comprising, as one component, polyisocyanate compositions and, as a second component, a polyol which is chosen from a cycloaliphatic diol or polyol having a molecular weight of from 100 to 500 and containing one or more 4 to 7 member aliphatic ring and an oligomeric diol or polyol comprising the condensation reaction product of from 30 wt. % to 78 wt. %, based on the total weight of reactants used to make the oligomer, and an acrylic or vinyl emulsion polymer.

10 Claims, No Drawings

WATERBORNE TWO COMPONENT POLYURETHANE COATING COMPOSITIONS COMPRISING ALICYCLIC RIGID POLYOLS

The present invention relates to aqueous two component polyurethane coating compositions comprising, as one component, polyisocyanate compositions and, as a second component, one or more cycloaliphatic diol or polyol having a molecular weight of from 100 to 500 and containing one or more 4 to 7 member aliphatic ring or an oligomeric diol or polyol made therefrom and a vinyl or acrylic emulsion polymer.

There remains the need for waterborne polyurethane coatings that offer good flow and leveling, good appearance (such as gloss and clarity), reasonable hardness, fast cure properties and low volatile organic compound (VOC) content. Conventional solvent-borne two-component polyurethane coating compositions provide excellent appearance but usually contain high levels of volatile organic solvents. Coating compositions from water reducible polyester polyols with isocyanates provide good flow and leveling, appearance and relatively low VOC; however, the drying speed of coatings made from these compositions is not satisfactory. On the other hand, current water-borne two-component polyurethane coating compositions comprising water-dispersible isocyanates and emulsion polymers significantly reduce the VOC level and have a reasonable cure speed, but yet fail to provide coatings having satisfactory appearance properties. The addition of low molecular weight oligomeric crosslinkers to such coating compositions may be useful to improve flow, leveling, and coating appearance; however it takes time for such low molecular weight oligomers to crosslink and build in final coating properties, thereby resulting in slow drying properties.

US patent publication no. 2008/0139775A1, to Wu et al., discloses two component waterborne polyurethane coating compositions that achieve improved abrasion resistance comprising (a) a water-dispersible polyester polyol component of the combination of one or more acrylic polyols and one or more polyester polyols; (b) water-dispersible polyisocyanate oligomers. However, Wu et al. discloses any polyester polyol and the coating compositions disclosed contain substantial amounts of organic volatile compounds.

The present inventors have endeavored to solve the problem of providing aqueous two-component polyurethane compositions that are hard, fast drying and low VOC compositions and that provide coatings with all of a satisfactory appearance, flow and leveling.

STATEMENT OF THE INVENTION

1. In accordance with the present invention, two component aqueous polyurethane compositions comprise, as one component, a polyisocyanate composition and, as the other component, a polyol composition of (i) one or more vinyl or acrylic emulsion polymer having a measured glass transition temperature (measured Tg) of from 10° C. to 100° C., preferably, from 20° C. to 80° C., and (ii) from 5 to 60 wt. %, based on the total weight of polyol solids, of one or more polyol chosen from at least one cycloaliphatic diol or polyol having a molecular weight of from 100 to 500 and containing one or more 4 to 7 member aliphatic ring, or an oligomeric diol or polyol comprising the condensation reaction product of from 30 wt. % to 78 wt. %, preferably, at least 40 wt. %, based on the total weight of reactants used to make the oligomer, of at least one cycloaliphatic diol or polyol having a molecular weight of from 100 to 500 and containing one or more 4 to 7 member aliphatic ring. The oligomeric diol or polyol of the present invention may have a molecular weight of from 200 to 3000, preferably from 200 to 2000, more preferably from 200-1000. Preferably, the cycloaliphatic diol or polyol is a cyclohexane dimethanol (CHDM), dianhydro-d-glucitol, or mixtures of 1,3 CHDM and 1,4 CHDM. More preferably, the compositions are substantially free of volatile organic compounds. The molecular weight is determined using gel permeation chromatography (GPC) against a polystyrene standard.

2. Preferably, to improve the chemical resistance of products made from the compositions of the present invention, the emulsion polymer of the polyol composition of 1 is a hydroxyl group containing polymer, such as the copolymerization product of a $C_1$ to $C_{18}$ alkyl(meth)acrylate with a hydroxyalkyl(meth)acrylate, such as hydroxyethyl methacrylate (HEMA) or hydroxyalkylacrylate (HEA).

3. Preferably, the aqueous emulsion polymer of 1 or 2, above is one or more acrylic emulsion polymer.

4. The cycloaliphatic diols or polyols of the composition of the present invention can contain an O or N as a heteroatom in any cycloaliphatic ring. Preferably, such a heteroatom containing diol or polyol comprises a dianhydro-d-glucitol.

5. Preferably, to further improve coating drying speed, the composition of the present invention, further comprises one or more catalyst, such as an organo-metallic, e.g. alkyl tin, or tertiary amine catalyst.

6. In another aspect of the present invention, the present invention provides two component polyurethane coating compositions comprising the compositions of any of 1, 2, 3, or 5. Such compositions can be pigmented or clear coat compositions.

7. In yet another aspect of the present invention, methods for using the compositions of any of 1, 2, 3, 4, 5 or 6 comprise combining the two components of the compositions to form a curable composition, applying the curable composition to a substrate; and curing the applied composition.

8. In the methods for using the curable compositions, suitable substrates may be chosen from wood, metal, plastic, concrete, wood, asphalt, hair, paper, leather, rubber, foam, or textiles, preferably, wood substrates.

9. In yet still another aspect of the present invention, methods comprise polymerizing acrylic or vinyl monomers in an aqueous medium to form a stable aqueous acrylic or vinyl emulsion, mixing the acrylic or vinyl emulsion with a cycloaliphatic diol or polyol and chosen from a cycloaliphatic diol or polyol having a molecular weight of from 100 to 500 and containing one or more 4 to 7 member aliphatic ring and an oligomeric diol or polyol comprising the condensation reaction product of from 30 wt. % to 78 wt. %, based on the total weight of reactants used to make the oligomer, of a cycloaliphatic diol or polyol having a molecular weight of from 100 to 500 and containing one or more 4 to 7 member aliphatic ring to form a diol or polyol component, and combining the polyol component with a polyisocyanate composition to form a curable composition.

All ranges are inclusive and combinable. For example, a weight percentage of 0.1 to 1 wt. %, preferably, 0.2 wt. % or more, or, preferably, up to 0.6 wt. % includes ranges of from 0.1 to 0.2 wt. %, from 0.1 to 0.6 wt. %, from 0.2 to 0.6 wt. %, from 0.2 to 1.0 wt. %, or from 0.1 to 1.0 wt. %.

Unless otherwise indicated, any term containing parentheses refers, alternatively, to the whole term as if no parentheses were present and the term without them (i.e. excluding the content of the parentheses), and combinations of each alternative. Thus, the term "(meth)acrylate" refers to any of an acrylate, a methacrylate, and mixtures thereof.

Unless otherwise specified, all temperature units refer to room temperature (~20-22° C.) and all pressure units refer to standard pressure.

As used herein, the term "acrylic", refers to any polymer which is the copolymerization product of more than 50 wt. %, based on the total weight of monomers used to make the polymer, of acrylic or methacrylic monomers, including acid, ester, amide, amine or alcohol functional monomers. Such polymers may comprise copolymers with vinyl monomers like styrene and vinyl esters.

As used herein, the term "aqueous" means water or a mixture of water and a minor portion (no more than 50 wt. %, based on the total weight of the water and any solvent) of one or more water miscible solvent.

As used herein, unless otherwise indicated, the term "measured glass transition temperature" or "measured Tg" refers to the glass transition temperature of a material as determined by Differential Scanning calorimetry (DSC) scanning between −90° C. to 150° C. while heating at a rate of 10° C./min. The Tg is the inflection point of the curve of heat flow vs. temperature or the maximum value on the plot of its derivative.

As used herein, the term "hydroxyl equivalent weight" or "HEW", in the case of acrylic or vinyl emulsion polymers having hydroxyl functional groups, is calculated based on theoretical calculation: taking the molecular weight of hydroxyl functional monomer, such as hydroxyalkyl(meth) acrylate, and divided by the weight fraction of such hydroxyl functional monomer used to make polyol. For commercially available polyols, unless otherwise indicated, the HEW given is that reported by the producer without further determination.

As used herein, the term, "hydroxyl functionality" refers to the average number of hydroxyls per molecule (per polymer or oligomer chain) and is the number average molecular weight of a polyol divided by its hydroxyl equivalent weight.

As used herein, unless otherwise indicated, the term "molecular weight" when referring to a polyol other than an oligomeric or polymeric polyol or emulsion polymer having hydroxyl functional groups refers to the mass of one mole of that polyol in grams.

As used herein, unless otherwise indicated, the term "weight average molecular weight" or "Mw" of a polymeric and oligomeric diol or polyol, e.g. a polyester or polycarbonate polyol, is a weight average molecular weight of a sample of that polymeric polyol as determined by gel permeation chromatography (GPC) of the polymer or oligomer in THF solvent as against a polystyrene molecular weight standard as calibration standard. EasiCal™ PS-2 standard (Agilent Technologies, Inc, Santa Clara, Calif.) against a polystyrene standard.

As used herein, unless otherwise indicated, the term polyol includes diols.

As used herein, unless otherwise indicated, the term "polyol solids" refers to diol or polyol and acrylic emulsion polymers and excludes water and any solvent.

As used herein, unless otherwise indicated, the term "polyisocyanate" refers to any isocyanate functional molecule having two or more isocyanate groups.

As used herein, the term "substantially free of volatile organic compounds" means that a composition contains less than 50 g/l, based on the total weight of the composition, or, preferably, less than 25 g/l of the total amount of non OH or mono-OH functional solvents or coalescents in a given composition.

The present inventors have found that aqueous low VOC two-component polyurethane compositions having, as one component, a polyisocyanate composition and, as the second component, a cycloaliphatic diol or polyol having a molecular weight of from 100 to 500 and containing one or more 4 to 7 member aliphatic ring and an addition polymerized emulsion polymer, provide coatings having good flow and leveling, good appearance, reasonably fast drying speed and reasonable coating hardness. The inventive diols or polyols contain rigid cycloaliphatic structures and, when mixed with high molecular weight/high Tg emulsion polymers, may partially or fully diffuse into the emulsion polymers. The high molecular weight and high Tg of emulsion polymers provide the fast drying properties while the low molecular weight diols or polyols allow good flow and leveling, and the good appearance. Moreover, the relatively rigid structure of low molecular weight diols or polyols also provide a relatively hard coating once water evaporates and the diols or polyols are at least partly crosslinked with isocyanate, preferably isocyanate trimers, which may further enable fast drying speed for coating compositions. In addition, as the inventive low molecular weight diols or polyols partially or fully diffuse into the emulsion polymers, they may act as coalescents and thereby reduce the minimum film formation temperature of the coating formulation. Further, the application of the coating compositions of the present invention on wood provide better warmth than known acrylic emulsion polymer based water-borne coatings.

The compositions of the present invention can be cured at ambient temperatures, or at temperatures ranging from sub ambient 4° C. to 150° C., preferably, from ambient conditions to 80° C. Cure temperatures may be varied depending on the substrate, so that heat sensitive plastics can be coated and the coatings cured at 120° C. or less. In addition, coatings applied in the field, such as maintenance coatings and coatings of bridges, heavy machinery and heavy mass parts may be cured at ambient temperatures. Curing times generally range from 10 minutes at elevated temperatures to 1 to 14 days at from 10 to 50° C. Such compositions are especially useful in making clearcoats, such as topcoats for wood, topcoats for automotive coatings applications and for ambient cure coatings for heavy mass parts or substrates.

The polyisocyanates for use in the polyisocyanate compositions of the present invention may include any molecule having 2 or more isocyanate groups and that can be dispersed in or dissolved in water at room temperature, and mixtures and combinations thereof. Such polyisocyanates can be aliphatic, aromatic or mixture of both. Although polyisocyanates have an average functionality of >2, preferably they have a higher functionality of from 2.5 to 10.

Examples of water-dispersible polyisocyanates include aliphatic diisocyanates, as well as dimers and trimers thereof, such as, for example, $C_2$-$C_8$ alkylene diisocyanates, such as tetramethylene diisocyanate and hexamethylene diisocyanate (HDI); alicyclic diisocyanates, as well as dimers and trimers thereof, such as, for example, isophorone diisocyanate (IPDI) and dicyclohexyl methane diisocyanate (HMDI); aromatic diisocyanates, as well as dimers and trimers thereof, such as, for example, toluene diisocyanate (TDI), and diphenyl methane diisocyanate (MDI). Preferably, the polyisocyanate compositions of the present invention comprise aliphatic polyisocyanates.

Polyisocyanate compositions of isocyanurates or trimers may be prepared by methods known in the art, for example, as disclosed in U.S. patent publication no. 2006/0155095A1, to Daussin et al., by trimerizing an alicyclic diisocyanate (e.g. isophorone diisocyanate) in the presence of one or more trimerization catalyst, such as, for example, a tertiary amine or phosphine or a heterogeneous catalyst, and, if desired, in the presence of solvents and/or assistants, such as co-catalysts, expediently at elevated temperature, until the desired NCO content has been reached, and then deactivating the catalyst using inorganic and organic acids, the corresponding acid-halides and alkylating agents and, preferably, heating. Isocyanurate compositions containing isocyanurates from aliphatic diisocyanates may likewise be formed by cyclizing aliphatic diisocyanates in the presence of one or more trimerization catalyst and then deactivating the catalyst. Any of the isocyanurates can be further modified by conventional methods to contain urethane, urea, imino-s-triazine, uretonimine or carbodiimide moieties.

Other suitable polyisocyanates may include, for example, polyether modified polyisocyanates, such as, for example, a polyalkoxylated isocyanurate having two isocyanate groups Further, a suitable polyisocyanate prepolymer composition may be formed by reaction of bis(isocyanotomethyl)cyclohexane and/or another aliphatic diisocyanate with a monol, diol, diamine, or monoamine, which is then modified by the reaction of additional isocyanate to form allophanate or biuret modified prepolymers. Such prepolymers may further comprise a polyalkoxy or polyether chain. Alternatively, such prepolymers can then be mixed with a trimerization catalyst giving an allophanate or biuret modified polyisocyanate isocyanurate compositions. Preparation of such allophanate or biuret prepolymers, followed by trimerization, is known in the art, see for example, U.S. Pat. Nos. 5,663,272 and 6,028,158.

Still further, suitable polyisocyanates may be modified by an aminosulfonic acid.

In accordance with the present invention, suitable diols or polyols may comprise any cycloaliphatic diol or polyol having a molecular weight of from 100 to 500 and containing one or more 4 to 7 member aliphatic ring or any oligomeric diol or polyol made from a cycloaliphatic diol or polyol having a molecular weight of from 100 to 500 and comprising at least 30 wt. % weight percent of cycloaliphatic diol and/or polyol and having a weight average molecular weight of from 200 to 3000, preferably from 200 to-2000, more preferably from 200 to 1000 to achieve coating compositions that are substantially free of VOCs with acceptable film forming properties.

Suitable diols or polyols include, for example, cyclohexanedimethanol (CHDM), especially 1,3 CHDM, 1,4 CHDM, mixtures thereof, dianhydro-d-glucitol, which has two 5 membered rings, each containing an oxygen atom, 4,8-Bis(hydroxymethyl)tricyclo [5.2.1.0$^{2,6}$] decane, and 2,2,4,4-tetramethyl cyclobutanediol, containing a 4 membered ring.

Oligomeric diols or polyols may include any oligomers comprising the condensation reaction product of at least 30 wt. % preferably, at least 40 wt. %, based on the total weight of reactants used to make the oligomer, of, any cycloaliphatic diol and/or polyol having a molecular weight of from 100 to 500 and containing one or more 4 to 7 member aliphatic ring. These may include, for example, oligo- or polyesters, short chain alkyds, oligo- or polycarbonates, oligo- or polyethers and oligo- or polylactones having a the desired low molecular weight. Such oligomers may be made by conventional means, such as by bulk polymerization. For example, polyesters may be made, e.g. from diacids or difunctional anhydrides or their salts cycloaliphatic diols or triols having one or more 4 to 7 member aliphatic rings. Likewise, other oligomers may be formed by reacting any cycloaliphatic polyol having a molecular weight of from 100 to 500 and containing one or more 4 to 7 member aliphatic ring in the presence of lactone reactants, e.g. caprolactone, to make polylactone polyols, or in the presence of carbonate reactants, e.g. trimethylene carbonate, to make polycarbonate polyols. An example of a suitable polyester polyol was made by condensing 2 CHDM molecules and 1 oxalic acid molecule, for which the polyol content was calculated as 76.2 wt. %.

Suitable diols or polyols are available as K-Flex™ 188 and K-Flex™ A308 polyester polyols from King Industries, Inc. (Norwalk, Conn.); Unoxol™ diol, a mixture of 1,3 CHDM and 1,4 CHDM (Dow Chemical, Midland, Mich.); and Polysorb P dianhydro-d-glucitol (Roquette, Lestrem, FR).

Suitable aqueous emulsion polymers may include acrylic, styrene-acrylic, styrene-butadiene, olefin, vinyl chloride, ethylene vinyl acetate, and polyvinyl acetate emulsion polymers, with acrylic and styrene-acrylic latexes being preferred. The emulsion polymer composition may have multiple measured Tgs with at least one measured Tg of from 10 to 100° C., preferably, 20° C. to 80° C. Such polymers can be, for example, multi-staged or multiple phase containing polymers. If the measured Tg of the emulsion polymer is too high, then suitable compositions require excessive solvent for workability. If the measured Tg of the polymer is too low, then coatings made from them can suffer from low hardness.

Suitable vinyl or acrylic emulsion polymers may include those formed by conventional means, such as, for example, emulsion polymerization in the presence of a free radical initiator, e.g. a peracid or its salt. In such polymers, hydroxyl group functionality may be provided by hydroxyl functional vinyl or acrylic monomers, such as hydroxyethyl methacrylate (HEMA), caprolactone(meth)acrylate or allyl alcohol. Monomers may be added to the polymerization as a single charge for higher molecular weight products, or, for lower molecular weights or multiple phase polymers, by gradual addition polymerization. It may also be advantageous to stage monomer additions non-uniformly into the polymer to form multiphase polymer particles to create a core-shell, hemispherical, or occluded morphology.

Monomers suitable for the preparation of the emulsion polymers include alkyl(meth)acrylates such as methyl(meth)acrylate, ethyl(meth)acrylate, butyl(meth)acrylate, 2-ethylhexyl(meth)acrylate, vinyl esters, vinyl ethers, allyl ethers, vinyl arenes, such as styrene, and combinations thereof. As used herein, the term "(meth)acrylic acid" refers to methacrylic acid or acrylic acid. Additional monomers may be used to prepare the acrylic emulsion polymer including carboxylic acid monomers such as (meth)acrylic acid and itaconic acid, and salts thereof; sulfonic acid monomers such as sodium styrene sulfonate and acrylamido-methyl-propane sulfonate and salts thereof; and phosphoric acid monomers such as phosphoethylmethacrylate and salts thereof. Monomers such as styrene, acrylonitrile, and acetoacetoxyethyl methacrylate (AAEM), as well as monomers capable of imparting co-curable functionality such as glycidyl(meth)acrylates and hydroxyalkyl(meth)acrylates, may also be used in the preparation of the acrylic emulsion polymer.

Where AAEM is used, it may be desirable to post-react the acrylate polymer with a primary amine or ammonia to form a polymer containing the corresponding enamine, acetoacetoxyethyl methacrylate enamine.

To enable harder or rubbery phases in the emulsion polymers of emulsion polymer, it may be advantageous to incorporate into the emulsion polymer small amounts of copolymerized multi-ethylenically unsaturated monomer groups, including allyl(meth)acrylate, diallyl phthalate, 1,4-butylene glycol di(meth)acrylate, 1,2-ethylene glycol di(meth)acrylate, 1,6-hexanediol di(meth)acrylate, and divinyl benzene.

Chain transfer agents may be used to control the molecular weight of acrylic emulsion polymers, examples of which include dodecylmercaptan, butyl mercaptopropionate, methylmercaptopropionate, hydroxy group containing mercaptans, such as hydroxyethyl mercaptan, and mercaptopropionic acid.

In one example, an aqueous dispersion or emulsion of an acrylic polymer containing a hydroxyl containing monomer, such as hydroxyethyl methacrylate or hydroxypropyl methacrylate, may be combined with a polyol (i.e. a diol) that is capable of forming a polymer by way of step-growth polymerization with a water dispersed urethane. The acrylic emulsion polymer can be prepared through free radical emulsion or suspension addition polymerization or by dispersion of a pre-formed polymer under shear into an aqueous medium.

Examples of suitable acrylic emulsion polymers may include acrylic and styrene-acrylic, polymers as well as acrylic and vinyl copolymers from vinyl acetate, preferably, acrylic and styrene-acrylic polymers.

Preferably, the acrylic emulsion polymer is hydroxyl functional. A co-polymerizable hydroxyl group functional monomer may be included by staged free radical polymerization in one or more phases of the emulsion polymer particle may offer advantages, such as faster film drying speed, over uniform distribution of over the emulsion polymer composition in total. For example, this could comprise placing all of the HEMA within a core or a shell of a core-shell emulsion polymer as opposed to a uniform distribution of HEMA in both phases.

Preferably, to improve coating film properties such as hiding, the vinyl or acrylic emulsion polymers can comprise multistage polymers, preferably acorn polymers, such as, for example, those described in U.S. Pat. No. 7,179,531(B2) that contain a first polymer stage formed from monomers that provide pendant pigment adsorbing functional groups, such as phosphorous acid groups, phosphorous acid ester groups, polyacid side chains and mixtures thereof, and contain in a second polymer stage the copolymerization product of hydroxyl group containing monomers such as hydroxyethyl (meth)acrylate or allyl alcohol. The two components of the aqueous compositions of the present invention may comprise equivalent ratios of the total number of isocyanate group equivalents in the polyisocyanate composition component, which may contain several different polyisocyanates, to the total number of hydroxyl group equivalents in the polyol composition in the range of from, for example, 0.7:1:0 to 4.0 to 1.0, or 0.8:1.0 or higher and 2.0:1.0 or lower.

To formulate the polyol component compositions, the emulsion polymer is combined with the diol or polyol compositions which are either in neat form (for water-soluble diols or polyols) or in the form of an aqueous dispersions (for less water-soluble diols or polyols). If aqueous dispersions, these diol or polyols are preferably micronized and is stabilized with a stabilizing amount of a surfactant, preferably at a concentration in the range of about 0.5 to 5 wt. %, based on total solids in this aqueous dispersion. Nonionic surfactants are preferred, including APEO free, non-ionic wetting agents such as polyalkylene oxide block copolymers, polyoxyethylene glycol alkyl ethers, glucoside alkyl ethers, fatty acid esters, glycerol alkyl esters, sorbitan alkyl esters, and polyoxyethylene glycol alkylphenol ethers, including commercially available wetting agents such as TRITON™ X405 Octylphenol Ethoxylate (Dow Chemical, Midland, Mich.). After the polyol composition is combined with acrylic emulsion polymer, the system is mixed at or above room temperature to create a stable dispersion.

In accordance with the present invention, adding one or more catalyst to the two-component polyurethane compositions enables one to enhance curing in compositions having a low VOC content. The catalyst can be any suitable catalyst for two-component water-borne polyurethane formulation. Examples include metal based catalysts such as tin-, bismuth-, zinc-, aluminum-, zirconium-containing catalysts or tertiary amine catalysts including aliphatic and cyclo-aliphatic tertiary amine catalysts which are mono-, di- or tri-amines, and mixtures thereof. Examples of metal based catalysts may include, for example, dibutyltin dilaurate, dibutyltin mercaptide, dibutyltin sulfide, dimethyltin mercaptide, dibutyltin mercaptoester, zirconium dionate, Al dionate, bismuth neodecanoate, and zinc amine compounds. Tertiary amine catalysts may include, but are not limited to, triethylene diamine, triethylene amine, 1,4-diazabicyclo[2.2.2]octane, 6-(dibutylamino)-1,8-diazabicyclo[5.4.0]undec-7-ene, dimethyl cyclohexyl amine and etc.

Suitable amounts of such a catalyst may range from 0.01 to 2.5 wt. %, based on the total polyisocyanate and polyol solids, preferably 0.1 to 1.0 wt. %.

The two-component polyurethane coating compositions of the present invention may further comprise conventional additives such as, for example, colorants, pigments and fillers, light stabilizers, UV absorbing compounds, flow aids, wetting and dispersing additives, defoamers, or rheology modifiers.

Coatings according to the present invention may be applied to a desired substrate by conventional means. Such coatings can be cured at ambient temperatures, or at temperatures ranging from 4 to 150° C., preferably ambient conditions to 80° C. Cure temperatures may be varied depending on the substrate, so that wood can be coated and the coatings cured at 85° C. or less. Curing times generally range from 10 minutes (at elevated temperatures) to 1 to 14 days.

The two-component polyurethane compositions of the present invention are particularly useful for producing paints and coatings. Such compositions should have a room temperature viscosity low enough to enable application by conventional methods and high enough to insure it will remain coated on a substrate.

The present invention further provides polyurethane coatings made from the two-component polyurethane coating compositions on any of the substrates mentioned above. Such coatings can be multilayer coatings over a primer layer and, optionally, a basecoat or color coat.

Suitable uses for the compositions of the present invention may include, for example, coatings, with or without a pigment or filler, an adhesive, a sealant, a primer, a caulk composition where the viscosity ranges higher than 1000 cPs at room temperature.

EXAMPLES

The following examples are provided to illustrate the present invention. The test methods used in the examples are described, as follows:

Gloss:

Gloss measurement was performed according to ASTM D523 (1999). Two-component aqueous polyurethane coatings were drawn down on a black release Leneta chart (Form RC-BC, B#4211 Leneta Company, Inc. Mahwah, N.J.) at 177.8 μm wet thickness and gloss was measured 7 days after cure at the given angle using a BYK Gardener micro-TRI-gloss μglossmeter (BYK-Gardner USA, Columbia, Md.). An average of three separate readings was recorded. An acceptable 20° gloss is 60 or more, preferably 70 or more.

Block Resistance:

Block resistance was measured on treated aluminum substrates. Two coated 10 cm×3.8 cm sections were placed face to face. A 1 kg weight was then placed on these sections intermediated by a #8 rubber stopper with the narrower end facing down. Block resistance was measured at the same time interval as the print resistance. For room temperature and 60° C. block resistance test, the weight was placed on the panels for 16 hours under 25° C. and 50% relative humidity and 30 minutes in 60° C. oven, respectively. The block resistance was judged according to the following scale and one measurement was taken on each coating:

10, no tack, perfect; 9, trace tack, excellent; 8, slight tack, very good; 7, slight tack, good; 6, moderate tack, good; 5, moderate tack, fair; 4, severe tack, no seal, fair; 3, 5-25% seal, poor; 2, 25-50% seal, poor; 1, 50-75% seal, poor; 0, complete seal, very poor.

An acceptable result is 2 or more and preferred result is 3 or more.

Print Resistance:

Print resistance was measured on coatings applied as disclosed below on chromated aluminum substrates. The print resistance test was measured on 3.81 cm×5.02 cm sections cut from the aluminum panel. A piece of cheesecloth, then a #8 rubber stopper with the narrower end facing down, topped by 1 kg weight were placed on these sections. The weight accounted for ~1.8 psi on the coating. Print resistance was measured both right after bake and 6 hours after bake. For room temperature and 60° C. print resistance test, the weight was placed on the panels for 16 hours in under 25° C. and 50% relative humidity and 30 minutes in 60 CC oven, respectively. The results were evaluated according to the following scale based on the amount of marks and the depth of marks on the coatings after weight removal. An average of two measurements was recorded.

| Rating or Score | Performance | Effect or Change |
|---|---|---|
| 10 | Perfect | None |
| 9 | Excellent | Trace |
| 8 | Very Good | Very Slight |
| 7 | Good-Very Good | Slight-Very Slight |
| 6 | Good | Slight |
| 5 | Fair-Good | Moderate-Slight |
| 4 | Fair | Moderate |
| 3 | Poor-Fair | Considerable-Moderate |
| 2 | Poor | Considerable |
| 1 | Very Poor | Severe |
| 0 | No | Complete Failure |

Pencil Hardness:

Pencil hardness was tested according to ASTM D3363 (2007) on coatings made as disclosed below on a chromated aluminum substrate after 7 days of cure. A pencil is pushed into the film. The hardness of the hardest pencil lead that did not cut into or gouge the film was recorded. A hardness of at least HB is acceptable, preferably, at least F.

Pencil hardness scale, from softest to hardest. SOFTEST: 6B, 5B, 4B, 3B, 2B, B, HB, F, H, 2H, 3H, 4H, 5H, 6H, 7H, 8H: HARDEST.

König Hardness:

König hardness was determined according to ASTM-D 4366 (1995) by using a pendulum hardness tester (Byk-Mallinckrodt Pendulum hardness tester, König model 5840, Byk Mallinckrodt GmbH, Germany). Two measurements were taken for each coating made as disclosed below on chromated aluminum substrates and the average was recorded. The König hardness was measured after 7 days of cure. König hardness in the range of an acceptable hardness level for a coating is 40 seconds or more, preferably, 70 seconds or more.

Film thickness of the coatings was determined using coating thickness gage (POSITECTOR™ 6000, Paul N. Gardner Company, Inc., Pompano Beach, Fla.).

Abbreviations and Materials Used in Examples

BA: Butyl acrylate;
MMA: Methyl methacrylate;
HEMA: Hydroxyethyl methacrylate;
MAA: Methacrylic acid;
nDDM: n-Dodecylmercaptan;
tBHP: t-Butylhydroperoxide, 70 wt. % in water;
SSF: Sodium sulfoxylate formaldehyde;
APS: Ammonium persulfate, 99%;
$Na_2CO_3$: Sodium carbonate, 99%;
DMM: Di(propylene glycol)dimethyl ether (Sigma Aldrich, MO)
Dowanol DPM: Dipropylene glycol methyl ether (Dow Chemical, Midland, Mich.)
MFFT: Minimum Film Formation Temperature;
Surfactant A: TRITON™ XN-45S (Polyethylene glycol 4-tert-octylphenyl ether from Dow Chemical, Midland Mich.
Surfactant B: DISPONIL™ FES-32 (Alkyl polyethoxysulfate, Na salt from Cognis (Ambler, Pa.),
Surfactant C: TRITON™ X-405 (Polyoxyethylene (40) isooctylphenyl ether, Dow Chemical, Midland, Mich.);
EDTA: Ethylenediamine tetraacetic acid, sodium salt;
T250: TERATHANE™ 250 (Polytetramethylene ether glycol, Mn=250) (Invista, Kans., USA)
Polyester polyol A: Polyester polyol from 60 mol % CHDM and aliphatic dicarboxylic acids determined by $^{13}C$ NMR spectra, HEW=244 Polyester polyol B: Polyester polyol from 38 mol % CHDM, 25 mol % hexanediol and aliphatic dicarboxylic acids, determined by $^{13}C$ NMR spectra, HEW=216
Polyester polyol C: Polyester polyol from 62 mol % 3-methyl-1,5-pentanediol and aliphatic dicarboxylic acids, determined by $^{13}C$ NMR spectra, listed HEW=211.
Emulsion Polymer A: Acrylic latex containing OH functional groups with a composition comprised of BA/MMA/STY/HEMA/MAA which has two calculated Tg's (transitions) of −5° C. and 78° C. (calculated using the Fox Equation (T. G. Fox, *Bull. Am. Physics Soc.*, Volume 1, Issue No. 3, page 123 (1956)), wherein a Tg of a copolymer of monomers M1 and M2 is given by 1/Tg=w(M1)/Tg(M1)+w(M2)/Tg(M2)) and has an HEW of 1300 on solids, 42% weight solids (Dow);
BAYHYDUR™ 302: Water-dispersible polyisocyanates comprising triisocyanurates of hexamethylene diisocyanate, listed NCO EW=243, 100% solids (Bayer MaterialSciences, Pittsburgh, Pa.);
CHDM-D90: A 90/10 weight percent solution of 1,4-CHDM in water. (Eastman, Kingsport, Tenn.);
POLYSORB™ P: Dianhydro-d-glucitol (Roquette, Lestrem FR);
TERATHANE™ 250: Polyether polyol from polytetramethylene ether glycol (PTMEG), Mw=230-270;
DURANOL™ T5650E: Aliphatic polycarbonate diol, listed Mn=500 (Asahi Kasei, Tokyo, JP)
Glycerol: (Sigma Aldrich, St. Louis, Mo.);
BYK™ 346: Wetting additive solution of a polyether modified siloxane (Byk USA Inc, Wallingford, Conn.)
BYK™ 028: (Byk USA);
REAXIS™ C333: (Reaxis Inc, McDonald, Pa.) TEGO FOAMEX™ 805: Defoamer, emulsion of a polyether siloxane copolymer, silica-free (Evonik Industries AG, Chester, Pa.);
TEGO™ 410: Slip and anti-blocking additive, polyether siloxane copolymer (Evonik Industries AG);

SURFYNOL™ 104 DPM: Nonionic wetting agent and molecular defoamer, (50% wt/wt active solution in dipropyleneglycol monomethylether, Air Products, Inc., Allentown, Pa.);

ACRYSOL™ RM-825: Non-ionic urethane rheology modifier (Dow, Midland, Mich.);

ACRYSOL™ 12W: Non-ionic hydrophobic ethoxylated urethane rheology modifier, solvent-free (Dow).

Example 1 and Comparative Examples A

Clear Coating Evaluations

Tables 1 and 2, below, indicate the formulations and properties, respectively of polyurethane coatings wherein an emulsion polymer/polyol dispersion (Example 1), an acrylic emulsion polymer (Comparative Example A) was used in Component A. In Example 1, acrylic Emulsion Polymer A, a polyol (23.89 gram) and CHDM-D90 (4.78 gram) were first mixed for 4 hours using a IKA Eurostar Power Control-visc stirrer (IKA Works, Wilmington, N.C.) at 500 RPM to achieve an dispersion and then formulated with other additives.

TABLE 1

Clear Coating Formulations

|  | Example 1 | Comparative Example A |
|---|---|---|
| Component A |  |  |
| Acrylic Emulsion Polymer A/ CHDM-D90 | 28.67 | — |
| Emulsion Polymer A | — | 64.15 |
| DMM | — | 1.95 |
| BYK 346 | 0.10 | 0.10 |
| TEGO 410 (50% in DPM) | 0.19 | 0.19 |
| ACRYSOL RM-825 | 1.11 | 0.34 |
| ACRYSOL 12W | 0.65 | — |
| SURFYNOL 104 DPM | 0.69 | 0.68 |
| BYK 028 | 0.99 | 0.98 |
| H$_2$O | 48.30 | 26.07 |
| 5% REAXIS C333 in water | 1.29 | — |
| Component B |  |  |
| BAYHYDUR 302 | 18.00 | 5.53 |
| Total | 100 | 100 |

TABLE 2

Coating properties

| Test | Example 1 | Comparative Example A |
|---|---|---|
| Gloss on black Leneta chart (20°/ 60°/85°) | 69.4/87.3/ 96.0 | 50.3/75.3/ 96.4 |
| 7 day Konig hardness (seconds) | 57.4 | 82.6 |
| 7 day Pencil hardness | F | ~H |
| 60° C. print resistance |  |  |
| Immediate after bake | 6 | 5 |
| 6 hours | 8 | 6.5 |
| Room temperature print resistance |  |  |
| Immediately after baking | 8 | 8 |
| 6 hours | 9 | 10 |

TABLE 2-continued

Coating properties

| Test | Example 1 | Comparative Example A |
|---|---|---|
| 60° C. block resistance |  |  |
| Immediately after baking | 4 | 5 |
| 6 hours | 7 | 6 |
| Room temperature block resistance |  |  |
| Immediately after baking | 3 | 6 |
| 6 hours | 8 | 8− |

As shown in Table 2, above, the coatings in Example 1 showed a surprisingly high gloss and a similar fast drying speed, especially early print resistance, when compared to acrylic emulsion polymer based PU coatings having a DMM coalescent in Comparative Example A. In addition, the Example 1 formulation does not need additional coalescent for film formation, demonstrating its ability in reducing VOC.

Formulation Example 1

Polyol Component as Aqueous Dispersion

The indicated polyols in Table 3, below, were added in the indicated amounts slowly and directly into the indicated acrylic emulsion polymer in the indicated amounts at a mixing speed of ~500-700 RPM and mixed for ~4 hours at room temperature using an IKA Eurostar Power Control visc stirrer (IKA Works, Wilmington, N.C.). The resulting dispersions were labeled as emulsion polymer/polyol dispersions in table 4, below.

In Example 2, 3, 4, CHDM-D90 was added directly to the indicated acrylic emulsion polymer at indicated amount under the mixing condition as described above.

In Example 5, dianhydro-d-glucitol (60 gram) was first dissolved in water (40 gram) to make a 60 wt. % aqueous solution and then added to the indicated acrylic emulsion polymer to the desired amount (as) slowly at a mixing speed of ~500-700 RPM and mixed for ~4 hours at room temperature.

In Example 6, to Polyester polyol A, water (10.0 gram) was added to polyol (30.0 gram) in the presence of TRITON™ X-405 (1.3 gram) and an aqueous dispersion was prepared using a homogenizer (IKA, Ultra-Turrax, T25 basic, (IKA Works) at speed 1 (6500 min$^{-1}$) for ~2 min. This dispersion was then added into the acrylic emulsion polymer (as) slowly at a mixing speed of ~500-700 RPM and mixed for ~4 hours at room temperature.

Aqueous dispersions of DURANOL™ T-5650E were formed by adding water (10.0 gram) to the polyol (30.0 gram) in the presence of TRITON™ X-405 (1.3 gram) and the aqueous dispersion was prepared using a homogenizer (IKA, Ultra-Turrax, T25 basic, (IKA Works) at speed 1 (6500 min$^{-1}$) for ~2 min. This dispersion was then added into the indicated acrylic emulsion polymer in the amount (indicated in Comparative Example 2) slowly at a mixing speed of ~500-700 RPM and mixed for ~4 hours at room temperature.

In Comparative Example 1 and 3, TERATHANE™ 250 or glycerol, as indicated, was added directly to the indicated acrylic emulsion polymer at indicated amount at a mixing speed of ~500-700 RPM using an IKA Eurostar Power Control, visc stirrer (IKA works).

TABLE 3

Emulsion Polymer-Polyol Dispersion Examples

| Material | 2 | 3 | 4 | 5 | 6 | Comp 1 | Comp 2 | Comp 3 |
|---|---|---|---|---|---|---|---|---|
| | | | | Weight (g) | | | | |
| ROSHIELD ™-3275 | 90.02 | 80.05 | 70.00 | 90.00 | 80.00 | 80.00 | 80.00 | 90.04 |
| CHDM-D90 | 4.67 | 9.34 | 14.00 | 0.00 | 0.00 | 0.00 | 0.00 | 0.00 |
| 60% POLYSORB ™ P solution in water | 0.00 | 0.00 | 0.00 | 7.00 | 0.00 | 0.00 | 0.00 | 0.00 |
| 75% K-FLEX ™ 188 in water | 0.00 | 0.00 | 0.00 | 0.00 | 11.20 | 0.00 | 0.00 | 0.00 |
| TERATHANE ™ 250 | 0.00 | 0.00 | 0.00 | 0.00 | 0.00 | 8.40 | 0.00 | 0.00 |
| 75% DURANOL ™ T5650E in water | 0.00 | 0.00 | 0.00 | 0.00 | 0.00 | 0.00 | 11.20 | 0.00 |
| Glycerol | 0.00 | 0.00 | 0.00 | 0.00 | 0.00 | 0.00 | 0.00 | 4.20 |
| $H_2O$ | 5.31 | 10.61 | 16.00 | 3.00 | 8.80 | 11.60 | 8.80 | 5.76 |
| Total | 100.0 | 100.0 | 100.0 | 100.0 | 100.0 | 100.0 | 100.0 | 100.0 |

Coating Preparation and Cure:

The formulated clears in Table 4, below, were formulated to a constant stoichiometry. The difference in amounts of polyisocyanates was due to the difference in the hydroxyl equivalent weights used in each respective emulsion polymer-polyol dispersion. The compositions were all formulated substantially free of additional coalescents. The clears were drawn down on the substrates indicated in test methods, above, at 177.8 µm wet thickness (unless otherwise specified) using a draw down bar. Dry film thickness was ~38.1 to 45.7 µm. The coatings were allowed to dry in the hood for 15 min and then were cured at 60° C. for 15 min in the oven. After bake, the coatings were taken out of the oven and further cured in the hood for overnight and then moved into a CTR (25° C., 50% relative humidity) to cure for 7 days.

As shown in Table 5, below, each of the inventive coating compositions 2 to 6 provided balanced coating properties including excellent gloss, good König hardness and pencil hardness, fast block resistance development. Example 4 provided somewhat slower 60° C., 0 hr block resistance; however, the overall property balance was better than Comparative Examples 1 to 3 where at least two properties were not satisfactory. For example, Comparative Example 1 provided poor König hardness and 60° C. 0 hr block resistance; Comparative Example 2 provided poor gloss and König hardness; Comparative Example 3 provided poor pencil hardness and 60° C. 0 hr block resistance.

TABLE 4

Coating Formulations

| Material | 2 | 3 | 4 | 5 | 6 | Comp 1 | Comp 2 | Comp 3 |
|---|---|---|---|---|---|---|---|---|
| | | | | Weight (g) | | | | |
| Component A | | | | | | | | |
| Emulsion Polymer-Polyol dispersion | 49.00 | 42.86 | 34.29 | 49.00 | 54.29 | 47.14 | 55.73 | 37.14 |
| $H_2O$ | 37.86 | 38.46 | 44.83 | 37.95 | 35.26 | 39.43 | 33.68 | 43.66 |
| BYK ™ 346 | 0.08 | 0.08 | 0.08 | 0.08 | 0.08 | 0.08 | 0.08 | 0.08 |
| TEGO FOAMEX ™ 805 | 0.94 | 0.94 | 0.94 | 0.94 | 0.94 | 0.94 | 0.94 | 0.94 |
| SURFYNOL ™ 104 DPM | 0.48 | 0.48 | 0.48 | 0.48 | 0.48 | 0.48 | 0.48 | 0.48 |
| ACRYSOL ™ RM-825 | 0.20 | 0.86 | 0.86 | 0.20 | 0.20 | 0.20 | 0.20 | 0.20 |
| ACRYSOL ™ 12W | 0.00 | 0.00 | 0.43 | 0.00 | 0.00 | 0.00 | 0.00 | 0.00 |
| Component B | | | | | | | | |
| BAYHYDUR ™ 302 | 11.43 | 16.31 | 18.09 | 11.34 | 8.74 | 11.72 | 8.87 | 16.49 |
| Total | 100.00 | 100.00 | 100.00 | 100.00 | 100.00 | 100.00 | 100.00 | 100.00 |

TABLE 5

Coating Properties

| Test | 2 | 3 | 4 | 5 | 6 | Comp 1 | Comp 2 | Comp 3 |
|---|---|---|---|---|---|---|---|---|
| 20 degree gloss | 59.5 | 74.3 | 79.9 | 76.2 | 64.4 | 77 | 29.6 | 68.7 |
| 7 day König hardness (s) | 116.9 | 100.8 | 46.2 | 102.9 | 78.4 | 28 | 34.3 | 62.3 |

TABLE 5-continued

| | Coating Properties | | | | | | | |
|---|---|---|---|---|---|---|---|---|
| Test | 2 | 3 | 4 | 5 | 6 | Comp 1 | Comp 2 | Comp 3 |
| 7 day Pencil hardness | H | F--H | HB | F | F | HB | HB | 3B |
| 60 C. 0 hr block resistance* | 4+ | 2 | 0 | 4 | 3 | 0 | 5– | 0 |
| RT 0 hr block resistance* | 5 | 3 | 2 | 3 | 5 | 3 | 5 | 2 |

*0 hr block resistance refers to the block resistance measured right after coatings were taken out of oven. For 60° C. measurement, coatings were in a 60° C. oven for 30 min under 1 kg weight. For RT measurement, coatings were in CTR (25° C., 50% humidity) for 16 hours under 1 kg weight.

Synthesis Example 1

Acrylic Emulsion Polymer with Hydroxyl Groups

A monomer emulsion was prepared by mixing deionized (DI) water (470 g), Surfactant A (55.2 g), BA (738.0 g), MMA (828.0 g), HEMA (180.0 g), MAA (54.0 g) and nDDM (9.0 g) in a vessel. A separate 5 L flask (reactor) was charged with deionized water (1450 g) and Surfactant A (2.9 g) and then brought to 86° C. under an $N_2$ purge. The reactor was charged with a solution of $Na_2CO_3$ (2.7 g) in 35.0 g of DI water, then rinsed with 5.0 g of DI water. A solution of APS (2.7 g) in 20.0 g of DI water was =charged to the reactor, followed by a 5.0 g rinse. The monomer emulsion was fed to the reactor at a rate of 14.5 g/min for 10 min, and then increased to a rate of 29.1 g/min for 80 min, while maintaining a reactor temperature of 84° C. A mixture of 2.7 g of APS and 135.0 g of deionized water was added to the reactor concurrently with the monomer emulsion feed at a rate of 0.79 g/min for the first 10 min and a rate of 1.59 g/min for 80 min.

After completion of addition, the monomer emulsion vessel was rinsed with DI water (35 g) and the reactor held at temperature for 15 min, and then cooled to 75° C., followed by the addition of 45.0 g of DI water. The reactor was cooled further to 65° C. and then held at temperature. A 0.15 wt. % aqueous solution of iron sulfate heptahydrate (10.0 g) was added, and then a separate solution of tBHP (2.2 g in 90.0 g deionized water) was added concurrently with a solution of SSF (3.6 g in 90.0 g of deionized water) over 35 min, followed by 5.0 g of DI water rinse for both. The reactor was cooled to 45° C. and aqueous ammonium hydroxide (30 wt. % aqueous) was added to the reaction until a pH ~4 obtained. The reactor was then cooled to 40° C. and a solution of 8.6 g of isothiazolone biocide in 35.0 g of DI water was fed to the reactor over 5 minutes, followed by rinsing with 5.0 g of DI water. The acrylic emulsion polymer was filtered through 100 and 325 mesh screens, and characterized gravimetrically for solids (42.2%), pH (5.2), and particle size (143 nm, Brookfield BI 90+ light scattering method).

Formulation Examples 7-8 and Comparative Example 4

In Example 7, 8 and Comparative Example 4, water (10.0 gram) was added to the indicated polyester polyol (30.0 gram) in the presence of TRITON™ X-405 (1.3 gram) and aqueous dispersions were prepared using a homogenizer (IKA, Ultra-Turrax, T25 basic, IKA Works) at speed 1 (6500 $min^{-1}$) for ~2 min. This dispersion was then added into the acrylic emulsion polymer of Synthesis Example 1 slowly at a mixing speed of ~500-700 RPM and mixed for ~4 hours at room temperature. The pH was then adjusted to 7.7 using 15% $NH_4OH$.

TABLE 6

| Aqueous Emulsion Polymer Polyol Dispersion | | | |
|---|---|---|---|
| | Example 7 | Example 8 | Comp 4 |
| | | Weight (g) | |
| Synthesis Ex. 1 Acrylic Emulsion Polymer | 80.00 | 80.00 | 80.00 |
| 75% Polyester polyol A in water | 11.20 | 0.00 | 0.00 |
| 75% Polyester polyol B in water | 0.00 | 11.20 | 0.00 |
| 75% Polyester polyol C in water | 0.00 | 0.00 | 11.20 |
| H2O | 8.80 | 8.80 | 8.80 |
| Total | 100.00 | 100.00 | 100.00 |

Coating Preparation and Cure:

The formulated clears in Table 7, below, were formulated to a constant stoichiometry. The difference in amounts of polyisocyanates was due to the difference of hydroxyl equivalent weights of the emulsion polymer-polyol dispersions in each Example. The clears were drawn down on different substrates at 177.8 μm wet thickness (unless otherwise specified) using a draw down bar. Dry film thickness was ~38.1-45.7 μm. The coatings were allowed to dry in the hood for 15 min and then were cured at 60° C. for 15 min in the oven. After bake, the coatings were taken out of the oven and further cured in the hood for overnight and then moved into a controlled atmosphere room (CTR) (25° C., 50% relative humidity) to cure for 7 days.

TABLE 7

| Coating Formulations | | | |
|---|---|---|---|
| Materials | Example 7 | Example 8 | Comp 4 |
| | | Weight (g) | |
| Component A | | | |
| Emulsion Polymer-Polyol dispersion | 55.07 | 53.97 | 53.79 |
| H₂O | 34.34 | 34.98 | 35.09 |
| BYK 346 | 0.08 | 0.08 | 0.08 |
| TEGO FOAMEX ™ 805 | 0.94 | 0.94 | 0.94 |
| SURFYNOL ™ 104 DPM | 0.48 | 0.48 | 0.48 |
| ACRYSOL ™ RM-825 | 0.20 | 0.20 | 0.20 |
| Component B | | | |
| BAYHYDUR ™ 302 | 8.87 | 9.33 | 9.41 |
| Total | 100.00 | 100.00 | 100.00 |

As shown in Table 8, below, the inventive coating compositions 7 and 8 provided overall balanced coating properties. Especially Example 7 showed excellent gloss, hard film with fast block resistance development. Example 8 was slow on block resistance development but provided excellent gloss, hard film in both König hardness and pencil hardness. However, Comparative Example 4 provided soft film in both König hardness and pencil hardness measurements, and it did not have fast block resistance development when subject to 60° C. 0 hr block resistance test.

TABLE 8

| Test | Coating Properties | | |
|---|---|---|---|
| | Example 7 | Example 8 | Comp 4 |
| 20 degree gloss | 69.6 | 71.8 | 77.3 |
| 7 day Konig hardness (s) | 68.8 | 53.2 | 21 |
| 7 day Pencil hardness | HB | HB | B |
| 60 C. 0 hr block resistance* | 2 | 0 | 0 |
| RT 0 hr block resistance* | 3 | 0 | 2 |

We claim:

1. A two-component polyurethane composition that is substantially free of volatile organic compounds and contains less than 50 g/l, based on the total weight of the composition, of non hydroxyl or mono-hydroxyl functional solvents or coalescents, comprising, as one component, a polyisocyanate composition and, as the other component, a polyol composition of (i) one or more vinyl or acrylic emulsion polymer having a measured glass transition temperature (measured Tg) of from 10° C. to 90° C., and (ii) from 5 to 60 wt. %, based on the total weight of polyol solids, which polyol solids are diols, polyols and emulsion polymers, of at least one polyol chosen from a cycloaliphatic diol or polyol having a molecular weight of from 100 to 500 and containing one or more 4 to 7 member aliphatic ring and an oligomeric diol or polyol comprising the condensation reaction product of from 30 wt. % to 78 wt. %, based on the total weight of reactants used to make the oligomeric diol or polyol, of at least one cycloaliphatic diol or polyol having a molecular weight of from 100 to 500 and containing one or more 4 to 7 member aliphatic ring.

2. The composition as claimed in claim 1, wherein the (i) vinyl or acrylic emulsion polymer is an acrylic emulsion polymer having a measured Tg of from 20° C. to 80° C.

3. The composition as claimed in claim 1, wherein the (i) vinyl or acrylic emulsion polymer is a hydroxyl group containing polymer.

4. The composition as claimed in claim 1, wherein the (ii) cycloaliphatic diol or polyol contains an O or N as a heteroatom in a cycloaliphatic ring.

5. The composition as claimed in claim 1, wherein the (ii) cycloaliphatic diol or polyol is a cyclohexane dimethanol (CHDM), a dianhydro-d-glucitol, a mixture of 1,3 CHDM and 1,4 CHDM, or is a polyol made therefrom.

6. The composition as claimed in claim 1, further comprising one or more catalyst.

7. The composition as claimed in claim 1, which is a pigmented or clear coat coating composition.

8. A method comprising combining the two components of the composition of claim 1 to form a curable composition, applying the curable composition to a substrate; and curing the applied composition.

9. The method as claimed in claim 8, wherein the substrate is chosen from any of wood, metal, plastic, concrete, asphalt, hair, paper, leather, rubber, foam, and textiles.

10. A method of making an aqueous composition which is substantially free of volatile organic compounds and contains less than 50 g/l, based on the total weight of the composition, of non hydroxyl or mono-hydroxyl functional solvents or coalescents, comprising polymerizing monomers in an aqueous medium to form a stable aqueous vinyl or acrylic emulsion polymer, mixing the emulsion polymer with at least one polyol chosen from a cycloaliphatic diol or polyol having a molecular weight of from 100 to 500 and containing one or more 4 to 7 member aliphatic ring and an oligomeric diol or polyol comprising the condensation reaction product of from 30 wt. % to 78 wt. %, based on the total weight of reactants used to make the oligomeric diol or polyol, of at least one cycloaliphatic diol or polyol having a molecular weight of from 100 to 500 and containing one or more 4 to 7 member aliphatic ring to form a polyol component, and combining the polyol component with a polyisocyanate composition to form a curable composition.

* * * * *